Jan. 2, 1945.  W. C. HEATH  2,366,527
MACHINE TOOL DRIVE UNIT
Filed Feb. 9, 1942  2 Sheets-Sheet 1

William C. Heath
INVENTOR.
BY
ATTORNEY.

William C. Heath
INVENTOR.

Patented Jan. 2, 1945

2,366,527

UNITED STATES PATENT OFFICE 2,366,527

MACHINE TOOL DRIVE UNIT

William C. Heath, Shorewood, Wis., assignor to A. O. Smith Corporation, Milwaukee, Wis., a corporation of New York Application February 9, 1942, Serial No. 430,098

2 Claims. (Cl. 74—242.16)

This invention relates to a machine tool drive unit or more particularly to a power drive that may be employed with machine tools of variable or single speeds.

One object of the present invention is to provide a machine tool drive unit that is economical to construct, light in weight and compact upon assembly.

Another object is to provide a machine tool drive unit with a flexibility that adapts it for driving various and sundry machine tools.

A further object is to provide a machine tool drive unit that is readily assembled or disassembled for cleaning or repair purposes.

Another object is to provide a belt drive in which the tightness of the belt can be more readily maintained.

Further objects will appear from the following description and accompanying drawings illustrating an embodiment of the invention.

In the drawings:

Fig. 4 is a sectional view of the machine taken at the gear transmission end thereof on the line 4—4 of Fig. 3; and Fig. 5 is a section taken on line 5—5 of Fig. 3.

Figure 1:
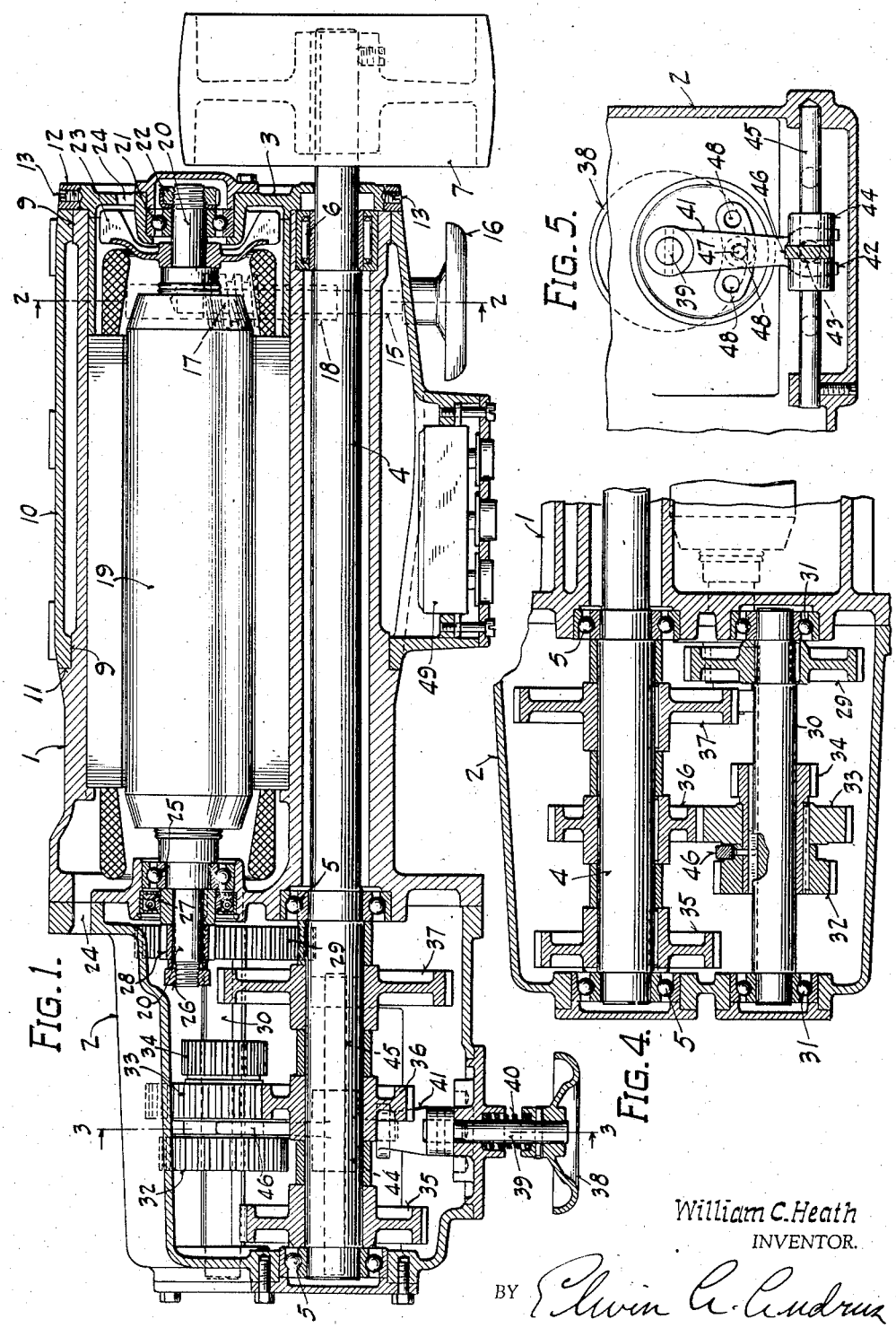
Figure 1 is a horizontal longitudinal section of a machine tool drive unit constructed in accordance with the invention.

The machine tool drive unit illustrated, comprises a tubular housing 1 having a gear case 2 constituting a head at one end and a plate 3 constituting a head at the opposite end. Within the housing 1 and off to one side of the rotational axis thereof is a longitudinally disposed drive shaft 4.

One end portion of the drive shaft 4 rests in the bearings 5 carried by the gear case 2 and the other end of the drive shaft is mounted in the cylindrical bearing 6 disposed within the housing 1 adjacent the end plate 3. The latter end of the drive shaft 4 projects through an opening provided in the end plate 3 to carry the pulley 7 engaging the belt 8.

The housing 1 is mounted for rotation in the friction bearings 9 within the casing 10. For assembly purposes the housings has a circumferential shoulder 11 which engages the end of the casing 10 at one bearing 9. A retaining collar 12 slips over the plate 3 of the housing and is secured thereto by suitable set screws 13 so as to engage the other end of the casing 10 at the other bearing 9 and prevent relative longitudinal movement between the housing and casing.

The tubular members 14 provide adjustable supports for the unit and are of the general nature of those disclosed in the co-pending application filed by the same inventor on February 9, 1942, Serial No. 430,097 for Machine tool drive support, and issued to Patent No. 2,353,465, on July 11, 1944.

The casing 10 carries a worm gear shaft 15 at the pulley end of the machine tool drive unit. One end of the gear shaft 15 extends outside the casing 10 and has a suitable operating device, such as the hand wheel 16 secured thereto. The other end of the gear shaft 15 is disposed within the casing 10 and is provided with the worm gear 17 which meshes into the complemental gear segment 18 secured to the housing 1.

Figure 2:
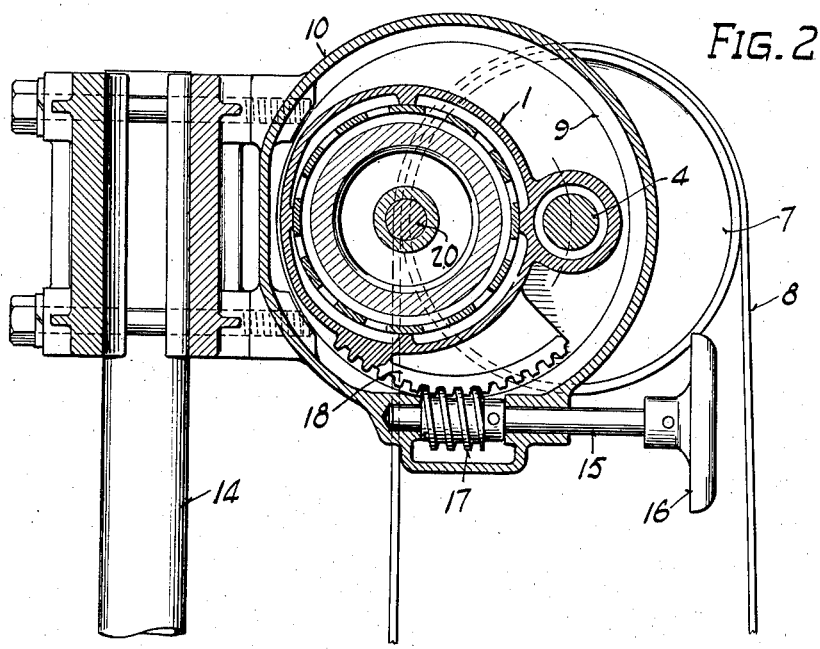
Fig. 2 is a section taken on line 2—2 of Fig. 1.
Figure 3:
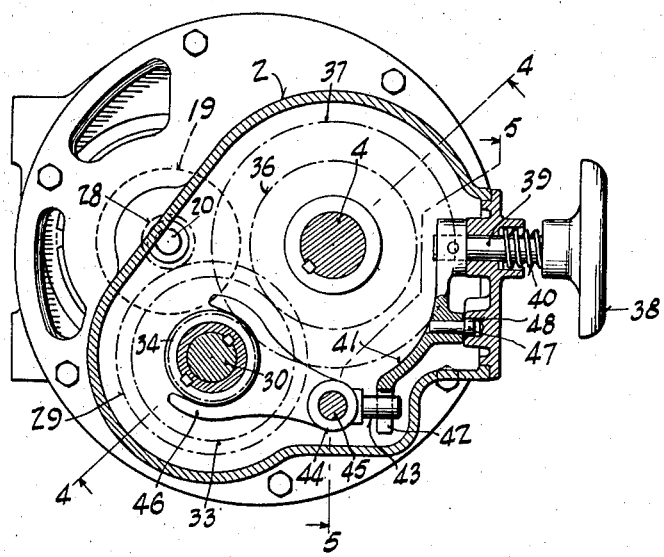
Fig. 3 is a sectional view through the shifting mechanism taken on line 3—3 of Fig. 1.

The manipulation of the hand wheel 16 turns the worm gear 17 which in turn moves the gear segment 18 secured to the housing 1, thereby rotating the housing 1 on its rotational axis in the friction bearings 9. The drive shaft 4, being to one side of the rotational axis of the housing, moves bodily in the path of an arc around this axis, to thereby tighten or loosen the pulley belt 8 carried by the pulley 7 and engaging a pulley on the machine to be driven by the machine tool drive unit not shown. In the embodiment illustrated in Fig. 2, if the wheel 16 is turned clockwise, the shaft 4 moves counterclockwise in an arc around the rotational axis of the housing to tighten the pulley belt. If the wheel 16 is turned counterclockwise, the shaft turns clockwise to loosen the belt.

The drive unit of the present machine preferably consists of an elongated electric motor 19 and a gear transmission by which power is transmitted from the motor to the drive shaft 4 actuating the pulley 7.

One end of the motor shaft 20 rests in the bearing 21 disposed in the end plate 3. The end plate 3 constituting one head of the housing is specially adapted to receive the end of the motor shaft 20 and the nut 22 threaded onto the end of the shaft prevents longitudinal movement of the shaft in the bearing 21.

The fan 23 disposed on the shaft 20 adjacent the bearing 21, in combination with the air holes 24 in the end plate 3 and in the opposite end of the housing 1 cool the motor 19 during operation.

The other end of the motor shaft 20 is mounted in the ball bearing 25 disposed at the gear end of the housing 1 and the nut 26 threaded onto the end of the motor shaft 20 retains the bearing assembly. A suitable sealing unit 27 seals the motor chamber against oil from the gear casing.

The gear end of the motor shaft 20 is provided with the pinion 28 keyed to the shaft and meshing with the large gear 29 rigidly carried by the countershaft 30, the respective ends of the countershaft being mounted in the bearings 31 disposed in the housing 1 and gear case 2, respectively.

A series of gears 32, 33 and 34, of varying size may be splined to the countershaft 30, as illustrated. These gears mesh respectively with the complemental gears 35, 36 and 37, disposed on the drive shaft 4 in spaced relation to drive the shaft at different speeds.

The gears 32, 33 and 34 are put into driving connection with the gears 35, 36 and 37, respectively, by operation of the hand wheel 38. The hand wheel 38 is connected to the outer end of a shaft 39 projecting through the gear case 2. The body portion of the shaft 39 carries a spring 40 between the head 2 and the hand wheel 38 to bias the shaft outwardly from the head 2, and the inner end of the shaft 39 is suitably secured to a crank 41.

The outer end of the crank 41 has a fork 42 for engaging a pin 43 on the shift block 44. The shift block 44 is disposed and longitudinally movable on the shaft 45. The shift block has an arm constituting a fork 46 extending on either side of the countershaft 30 between gears 32 and 33 to move the group of gears 32, 33 and 34 longitudinally on the countershaft.

The crank 41 in its body portion carries the pin 47 whose projecting end fits into the aperture 48 cast in the gear case 2. In the embodiment illustrating the invention there are three apertures 48 to match the three gear ratios of the gear train.

The wheel 38 is pushed in to dislodge the pin 47 from one of the apertures 48 which the pin engages. The wheel is then turned to move the crank 41 and fork 46 and thereby move the group of gears 32, 33 and 34 longitudinally on the countershaft 30 until one of these gears engages one of the complemental gears 35, 36 or 37 on the drive shaft 4. When the desired gears are in mesh, pressure on the wheel 38 is released and the spring 40 moves the shaft 39 with crank 41 outwardly, thus forcing the pin 47 into the respective aperture 48. This holds the gear train in place while the unit is in operation.

The center gear 33 carried by the countershaft 30 is larger than either the gear 32 or 34. This permits the gears 32 and 34 to be moved past the gear 36 on the drive shaft 4 complemental to the gear 33, to put the gear 32 in driving connection with the gear 35 and the gear 34 in driving connection with the gear 37. Due to the different gear ratios between the respective pairs of gears 32—35, 33—36 and 34—37, the shaft 4 may be rotated at different speeds depending upon which gear is driving the shaft.

Any other suitable shifting mechanism providing speed changes may be employed as the change speed mechanism here described is not essential to carry out the invention. If only a single speed drive unit is desired a single pinion and gear reduction from the motor or from the countershaft to the drive shaft may be employed.

The unit has a control box 49 secured to the outside of the casing 10 with switches for starting, stopping or reversing the electric motor 19.

In the operation of the machine shown and described, the belt 8 passing around the pulley 7 is slipped over the pulley of the machine to be driven and the supports 14 are adjusted to move the drive unit in such a manner that the pulley belt 8 will be reasonably loose.

The wheel 16 disposed on the outside of the drive unit is next turned clockwise. This rotation of the wheel turns the worm gear shaft 15 carrying the worm gear 17 meshed into the gear segment 18 secured to the motor housing 1, thereby moving the latter and causing the gear segment 18 to describe an arc around the rotational axis of the housing. Since the drive shaft 4 carrying the pulley 7 engaging the belt 8 is disposed in the housing 1 to one side of the rotational axis thereof, the shaft 4 moves bodily counterclockwise in the same direction as the gear segment 18 and thereby tightens the belt 8 to the desired degree of tightness.

After the belt is tightened, as described, the hand wheel 38 is manipulated to move the group of gears 32, 33 and 34 splined to the countershaft 30 until one of these gears of the desired speed engages one of the respective complemental gears 35, 36 or 37 on the shaft 4 to drive the shaft. The "start" switch in the control box 49 is then pushed to put the electric motor 19 in operation. Power is transmitted from the motor to the countershaft and thence to the drive shaft 4 by the system of gears described to drive the shaft at the speed desired and revolve the belt engaged by the pulley connected to one end of the drive shaft.

If different speeds in the drive shaft are desired the handwheel 38 is operated to put into driving connection either the gears 32—35 or 33—36 or 34—37, depending upon which set of gears has the desired speed.

The invention has numerous advantages. In the event that it is necessary to clean or repair any part of the unit, the motor and gear transmission parts may be easily and quickly removed by merely unbolting the heads at the ends of the housing and then removing the parts which secure the motor, gear transmission and drive shaft within the unit.

The gear transmission is located at the opposite end of the unit from that of the pulley, permitting removal and assembly of the gears without disturbing the mounting of the motor and the drive shaft carrying the pulley. The gears of the unit are also mounted in a separate compartment for running in oil without injury to the motor.

The invention may be employed with chain drives as well as with belt drives.

The invention may have various embodiments within the scope of the accompanying claims.

I claim:

1. A machine comprising a housing mounted for rotation in a sleeve encircling the same, a power drive unit including an electric motor within the housing and having a main drive shaft extending parallel to and to one side of the rotational axis of the housing, a member to be driven by said shaft, and a hand operated worm gear disposed in an opening in said sleeve and meshing with a gear segment on said housing to rotate the latter and effect a driving connection between said shaft and said member.

2. In a machine tool drive unit, an electric motor having a cylindrical housing, a main drive shaft extending alongside of said motor and generally parallel to the motor shaft, a variable speed transmission at one end of said motor and disposed in a detachable casing secured to the end of the motor housing to drive said main shaft from said motor, a member to be driven by said main shaft at the end of said motor opposite said transmission, a bearing encircling said motor housing between the ends thereof to support the same for rotation on an axis offset from said main drive shaft, and a manual adjusting device connecting said bearing and motor housing for rotating the latter to a position for connecting said drive shaft to said member to effect operation of the latter.

WILLIAM C. HEATH.